US008240056B2

(12) United States Patent
Annaka et al.

(10) Patent No.: US 8,240,056 B2
(45) Date of Patent: Aug. 14, 2012

(54) APPARATUS AND METHOD FOR MEASURING BEVEL PERIMETER OF SPECTACLE LENS

(75) Inventors: Satoshi Annaka, Tokyo (JP); Shuichi Sato, Tokyo (JP)

(73) Assignee: Hoya Corporation, Tokyo (JP)

( * ) Notice: Subject to any disclaimer, the term of this patent is extended or adjusted under 35 U.S.C. 154(b) by 87 days.

(21) Appl. No.: 12/935,897

(22) PCT Filed: Mar. 30, 2009

(86) PCT No.: PCT/JP2009/056543
§ 371 (c)(1),
(2), (4) Date: Dec. 27, 2010

(87) PCT Pub. No.: WO2009/123143
PCT Pub. Date: Oct. 8, 2009

(65) Prior Publication Data
US 2011/0088272 A1    Apr. 21, 2011

(30) Foreign Application Priority Data
Apr. 4, 2008    (JP) .............................. 2008-098049

(51) Int. Cl.
G01B 5/20 (2006.01)
G02C 7/02 (2006.01)
G02C 13/00 (2006.01)
(52) U.S. Cl. ....................................................... 33/507
(58) Field of Classification Search ................... 33/507, 33/28
See application file for complete search history.

(56) References Cited

U.S. PATENT DOCUMENTS

| | | | | |
|---|---|---|---|---|
| 4,169,318 A | * | 10/1979 | Cortes .............................. | 33/507 |
| 4,612,732 A | * | 9/1986 | Delattre et al. ............... | 451/240 |
| 5,121,548 A | * | 6/1992 | Daboudet et al. .............. | 33/507 |
| 5,501,017 A | * | 3/1996 | Suzuki ............................ | 33/200 |
| 5,594,992 A | * | 1/1997 | Suzuki et al. ................... | 33/200 |
| 6,243,960 B1 | * | 6/2001 | Andrews et al. ................ | 33/507 |
| 7,866,053 B2 | * | 1/2011 | Meunier et al. ................ | 33/200 |
| 8,015,716 B2 | * | 9/2011 | Matsuyama ................... | 33/200 |

FOREIGN PATENT DOCUMENTS

| | | | |
|---|---|---|---|
| EP | 2264396 A1 | * | 12/2010 |
| JP | S62-137510 A | | 6/1987 |
| JP | H06-175087 A | | 6/1994 |
| JP | 2000-074656 A | | 3/2000 |
| JP | 2001-174252 A | | 6/2001 |
| JP | 2004-003946 A | | 1/2004 |
| JP | 2004-037467 A | | 2/2004 |

* cited by examiner

*Primary Examiner* — Christopher Fulton
(74) *Attorney, Agent, or Firm* — Blakely, Sokoloff, Taylor & Zafman

(57) ABSTRACT

A bevel perimeter measurement apparatus (1) includes a retractable slider (3), a stylus holder (5) disposed to be vertically movable on the slider (3), a stylus (13) which has a bevel measurement groove (30) formed on its outer periphery and is provided on the stylus holder (5), a pressing force application device (14) which moves the slider (3) forward at the time of bevel measurement to press the stylus (13) against the edge surface (50c) of a spectacle lens (50), and a retracting device (19) which holds the stylus holder (5) at the retraction position during non-measurement. When the stylus holder (5) is released from the retracting device (19) at the time of measurement, it ascends using the spring force of biasing springs (27) to engage the bevel measurement groove (30) in the stylus (13) with a bevel (52) of the spectacle lens (50).

8 Claims, 9 Drawing Sheets

APPARATUS AND METHOD FOR MEASURING BEVEL PERIMETER OF SPECTACLE LENS

This is a non-provisional application claiming the benefit of International application number PCT/JP2009/056543 filed Mar. 30, 2009.

TECHNICAL FIELD

The present invention relates to an apparatus and method for measuring the bevel perimeter of a spectacle lens, which are used to examine whether a spectacle lens precisely fits in the rim of a spectacle frame.

BACKGROUND ART

A spectacle lens is fabricated by edging an uncut circular lens into a round shape based on the rim shape data of a spectacle frame by an edging device. In the edging, a bevel (V-shaped projection) to be inserted in the bevel groove (V-shaped groove) in the spectacle frame is formed on the edge surface of the spectacle lens. After the round spectacle lens is fabricated, the perimeter and shape of the bevel vertex are three-dimensionally measured by a bevel perimeter measurement apparatus disclosed in, for example, Japanese Patent Laid-Open No. 2000-74656 or 06-175087 to examine whether the spectacle lens precisely conforms to the rim shape of the spectacle frame.

In measuring the bevel by the bevel perimeter measurement apparatus, the beveled spectacle lens has its center held from above and below in an almost horizontal state by a lens holding means to engage a V-shaped groove formed in a stylus (measurement unit) with the bevel. Next, in this state, the stylus is moved along the bevel vertex, and the rotation angle, a horizontal displacement, and a vertical displacement of the stylus from a reference point for the stylus or lens are measured by a rotation angle measurement device, horizontal displacement measurement device, and vertical displacement measurement device, respectively. Based on these measured values (θ, r, z), the perimeter and shape of the bevel vertex of the edged spectacle lens are calculated by a perimeter calculation means. Lastly, the calculated perimeter and shape are compared with the rim shape data of the spectacle frame to determine whether the lens meets edging evaluation criteria.

DISCLOSURE OF INVENTION

Problem to be Solved by the Invention

However, note that both the conventional bevel perimeter measurement apparatuses described in Japanese Patent Laid-Open Nos. 2000-74656 and 06-175087 mentioned above vertically move the stylus based on the round shape data of the lens to press the V-shaped groove against the bevel of the spectacle lens. Therefore, to measure a lens whose data is absent (e.g., a lens manufactured by a manufacturer different from one who manufactured the measurement apparatus), the operator must manually vertically move the stylus to engage the V-shaped groove with the bevel, thus increasing the operation load of the operator.

The present invention has been made to solve the above-mentioned conventional problem, and has as its object to provide an apparatus and method for measuring the bevel perimeter of a spectacle lens, which can automatically engage a bevel measurement groove provided in a stylus with a bevel without requiring the operator to finely match the positions of the groove and bevel even if a lens whose data is absent is to be measured.

Means of Solution to the Problem

In order to achieve the above-mentioned object, according to an aspect of the present invention, there is provided an apparatus for measuring a bevel perimeter of a spectacle lens, comprising a retractable slider, a stylus holder disposed to be vertically movable on the slider, a rod-like stylus which is held by the stylus holder and has a bevel measurement groove formed on an outer periphery thereof, a horizontal displacement measurement device which senses that the stylus has engaged with a bevel, based on determination as to whether the stylus holder has moved in a horizontal (Y-axis) direction upon the engagement, and measures a horizontal displacement of the stylus, a pressing force application device which moves the slider forward at a time of bevel measurement to press the stylus against an edge surface of the spectacle lens, thereby engaging the bevel measurement groove with the bevel, a stylus lift device which lifts the stylus holder at the time of bevel measurement, a rotation angle measurement device which measures a rotation angle of the spectacle lens with respect to the stylus, and a Z-axis-direction displacement measurement device which detects a vertical displacement of the stylus.

According to another aspect of the present invention, there is provided a method of measuring a bevel perimeter of a spectacle lens, comprising the steps of pressing a portion, of an outer peripheral surface of a rod-like stylus having a bevel measurement groove formed on the outer peripheral surface, above the bevel measurement groove against an edge surface of the spectacle lens by a predetermined pressing force, lifting the stylus while the stylus is pressed against the edge surface of the spectacle lens, to engage the bevel measurement groove with a bevel formed on the edge surface of the spectacle lens, and rotating the spectacle lens when the bevel measurement groove has engaged with the bevel, and measuring a rotation angle of the spectacle lens with respect to the stylus, a horizontal displacement of the stylus, and a vertical displacement of the stylus.

Effects of the Invention

In the present invention, the stylus lift device lifts the stylus holder at the time of bevel measurement. When the stylus reaches the bevel position upon ascending together with the stylus holder, it is pressed by a pressing force generated by the pressing force application device, so the bevel measurement groove engages with the bevel. Hence, even if the bevel of a spectacle lens whose data is absent is to be measured, the bevel measurement groove can reliably engage with the bevel in a short period of time without requiring the operator to finely adjust the position of the stylus to engage the V-shaped groove with the bevel. As one example, a biasing spring may be used as the stylus lift device. As another example, this device may include a motor, a screw rod which converts rotation of the rotating shaft of the motor into vertical movement, and a pivoting lever which pivots upon the vertical movement of the screw rod.

Also, the bevel perimeter measurement method according to the present invention can reliably engage the bevel measurement groove with the bevel.

BEST MODE FOR CARRYING OUT THE INVENTION

A bevel perimeter measurement apparatus according to the present invention will be described in detail below with reference to an embodiment shown in the accompanying drawings.

Figure 1:
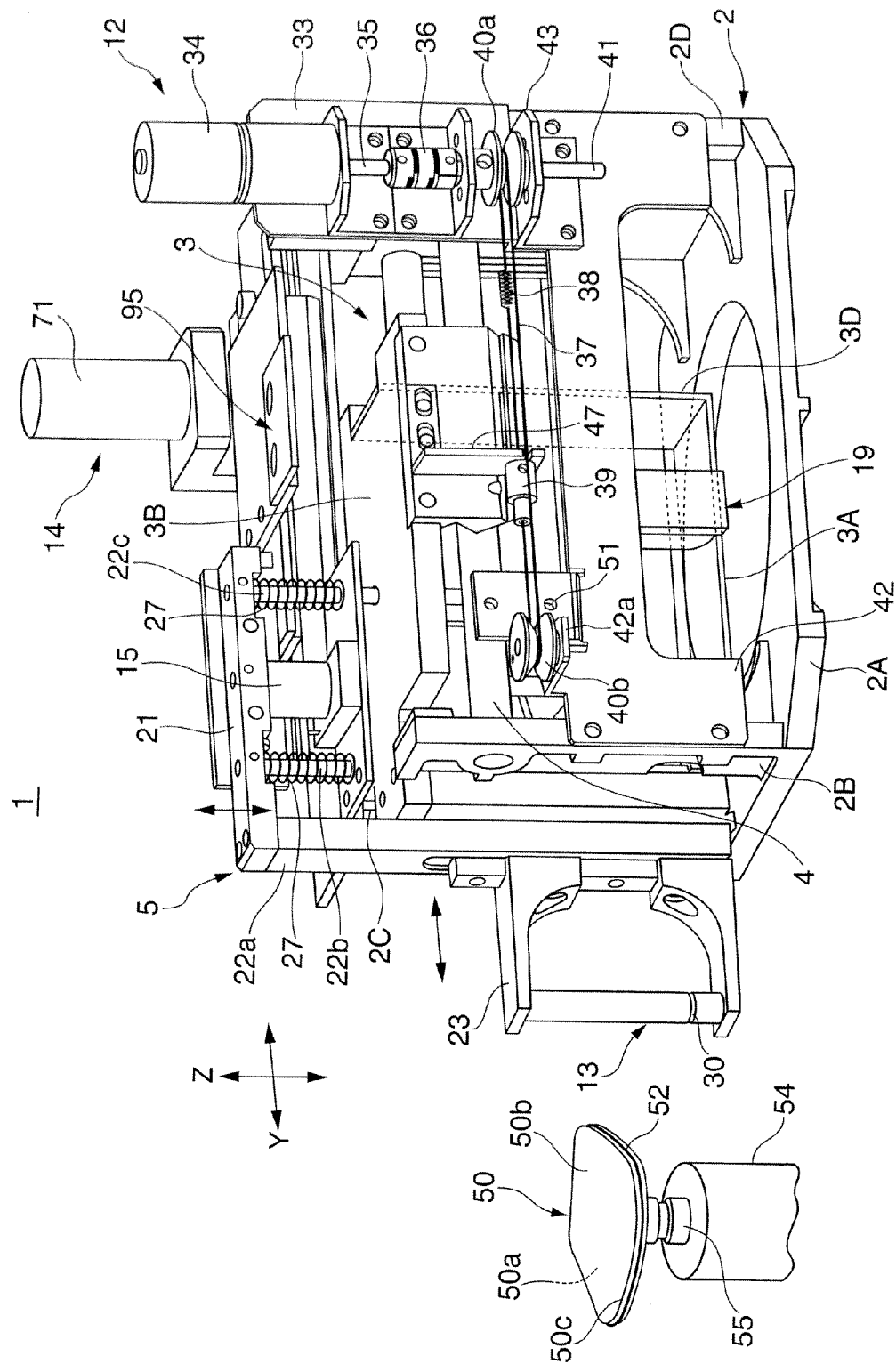
FIG. 1 is an external perspective view showing an embodiment of a bevel perimeter measurement apparatus according to the present invention.

Referring to FIG. 1, a bevel perimeter measurement apparatus 1 includes a slider 3 retractably disposed on a frame 2.

Figure 3:
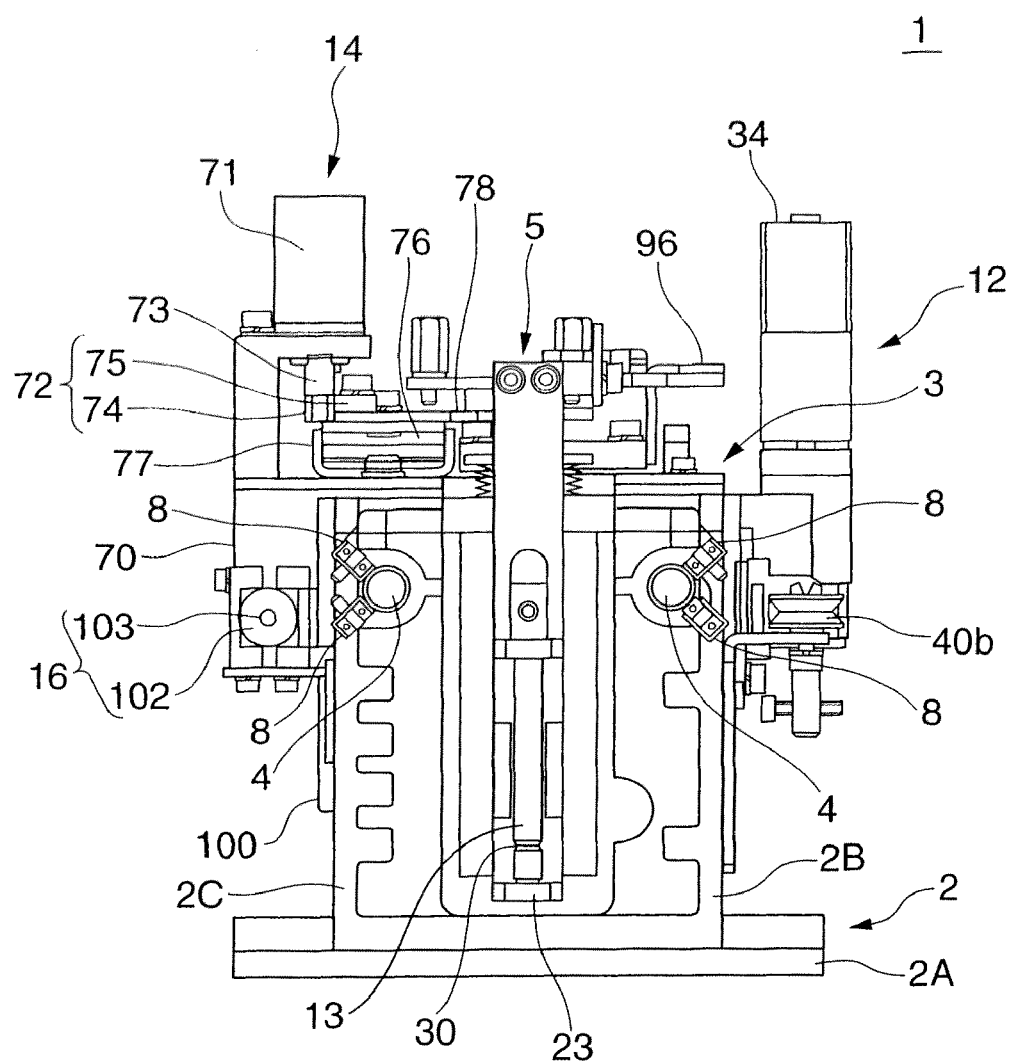
FIG. 3 is a front view of the bevel perimeter measurement apparatus.

The frame 2 includes a bottom plate 2A and a total of three support portions 2B, 2C, and 2D, which are formed integrally with each other using a casting of, e.g., aluminum. The two support portions 2B and 2C integrally stand upright on the front end side of the upper surface of the bottom plate 2A, and the single support portion 2D integrally stands upright on its rear end side. The front support portions 2B and 2C stand upright so as to face the front end portion of the upper surface of the bottom plate 2A on the right and left sides, respectively. The rear support portion 2D is formed in a flat plate shape with a width nearly equal to the interval between the outer surfaces of the front support portions 2B and 2C. A pair of right and left guide bars 4 which slidably hold the slider 3 are parallelly, horizontally suspended between the front support portions 2B and 2C, respectively, and the rear support portion 2D. The frame 2 is equipped with, e.g., a Y-direction driving device 12, pressing force application device 14, and horizontal displacement measurement device 16 (FIG. 3). The Y-direction driving device 12 drives the slider 3 in the Y direction (forward/backward direction). The pressing force application device 14 applies a predetermined pressing force to a stylus 13 via a stylus holder 5. The horizontal displacement measurement device 16 measures movement of the slider 3 as a horizontal (Y-direction) displacement of the stylus 13.

Figure 5:
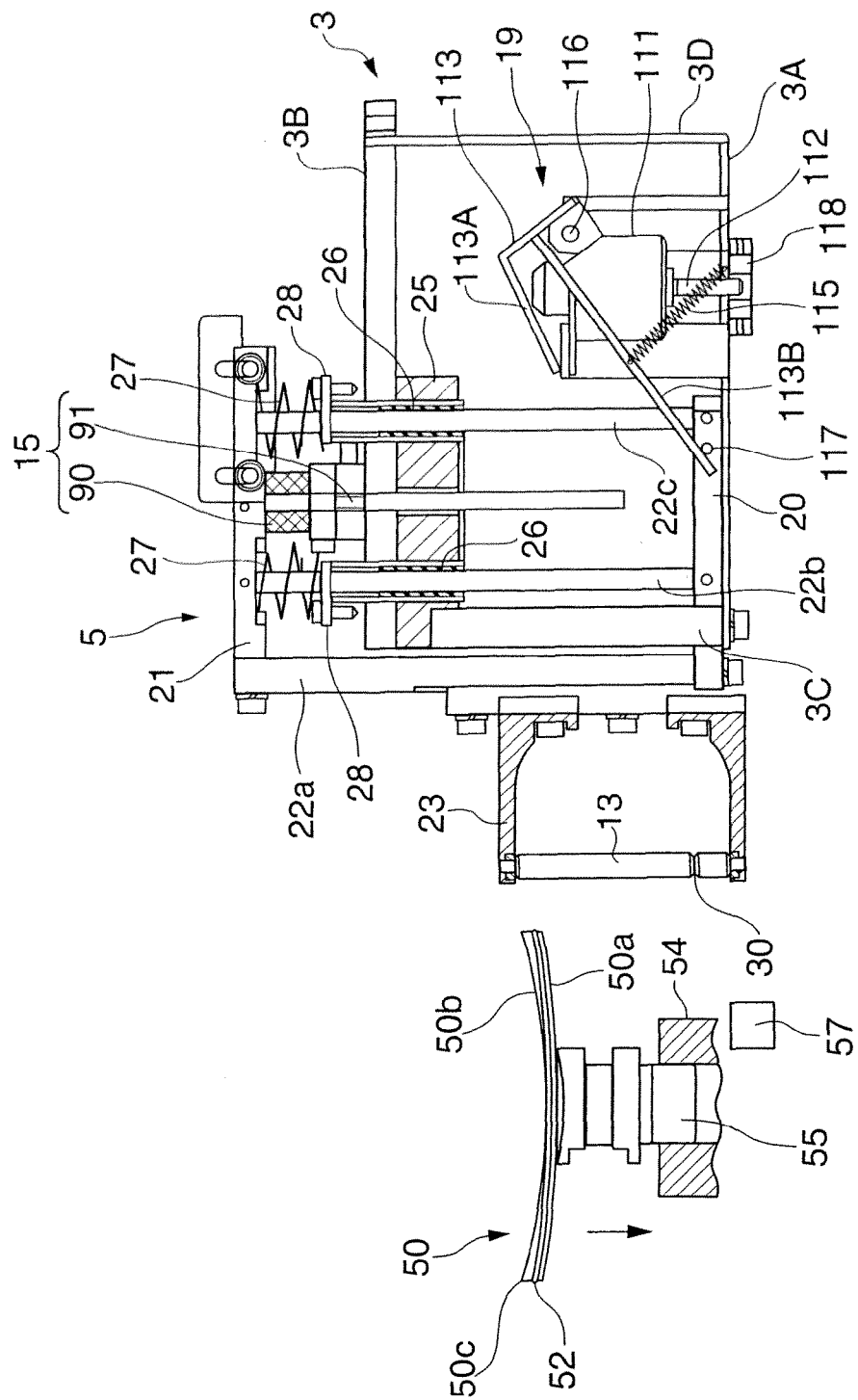
FIG. 5 is a sectional view showing the state in which a stylus holder is retracted during non-measurement.

Referring to FIG. 5, the slider 3 is formed in a rectangular box shape which is open to both the right and left sides using, e.g., a bottom plate 3A, an upper plate 3B, a column 3C which connects the front ends of the bottom plate 3A and upper plate 3B to each other, and a connecting plate 3D which connects the rear ends of the bottom plate 3A and upper plate 3B to each other. The slider 3 is retractably accommodated in the space formed among the support portions 2B, 2C, and 2D of the frame 2. A pair of bearings 8 (FIG. 3) which move the slider 3 along the guide bars 4 are attached on both the right and left sides of the upper plate 3B. The bearings 8 roll while being in contact with the guide bars 4. The slider 3 is equipped with the stylus holder 5, a Z-axis-direction displacement measurement device 15 (FIG. 5), and a retracting device 19 (FIG. 5). The stylus holder 5 holds the stylus 13. The Z-axis-direction displacement measurement device 15 detects vertical movement of the stylus holder 5 as a vertical (Z-direction) displacement of the stylus 13. The retracting device 19 normally keeps the stylus holder 5 and, in turn, the stylus 13 retracted at the retraction position (lowermost position).

The stylus holder 5 includes, e.g., a bottom plate 20, an upper plate 21, and a single column 22a and two guide shafts 22b and 22c which connect the plates 20 and 21 to each other. The stylus holder 5 is disposed inside the slider 3 to be vertically movable while partially projecting to the outside. The stylus holder 5 is normally held at the retraction position (lowermost position) by the retracting device 19. The stylus 13 is attached to the lower portion of the front face of the column 22a through a support body 23. On the other hand, the two guide shafts 22b and 22c slidably run through holes in an attachment plate 25, provided on the lower surface of the upper plate 30 of the slider 3, through linear bushes 26, and respectively include biasing springs 27 disposed at their upper end portions as a stylus lift device which lifts the stylus holder 5. The biasing springs 27 are compression coil springs, and are elastically attached between the upper plate 21 and spring plates 28 attached to the guide shafts 22b and 22c, respectively, thereby biasing the stylus holder 5 toward an upper position.

The stylus 13 is a cylindrical rod, and has its upper and lower ends held by the support body 23. An annular V-shaped bevel measurement groove 30 is formed in the lower portion of the outer peripheral surface of the stylus 13.

Referring to FIG. 1, the Y-direction driving device 12 includes a reversible Y-direction driving motor 34. The Y-direction driving motor 34 is attached to the outer surface of the support portion 2D of the frame 2 through a plate 33, and transmits rotation of an output shaft 35 to the slider 3 via a coupling 36 and wire 37. The wire 37 is formed to have no ends, includes, at its middle portion, a spring 38 and pressing unit 39 for use in tension application, and is kept taut between a pair of pulleys 40a and 40b. The rear pulley 40a is a drive pulley, and is fixed on a rotating shaft 41 connected to the output shaft 35 of the Y-direction driving motor 34 through the coupling 36. The rotating shaft 41 is rotatably axially supported by a bracket 43 provided on the rear end side of an attachment plate 42. The front and rear end portions of the attachment plate 42 are fixed to the outer surfaces of the support portions 2B and 2D, respectively, of the frame 2. On the other hand, the front pulley 40b is a driven pulley, and is rotatably axially supported by an attachment portion 42a provided at the front end portion of the attachment plate 42.

During non-measurement, the pressing unit 39 is pressed against a stopper plate 47, attached to the slider 3, from the front side by the rotation driving force of the motor 34 clockwise in FIG. 1. In this state, the slider 3 is held at the origin position in the Y direction. The motor 34 is driven forward (counterclockwise in FIG. 1) at the time of bevel measurement of a spectacle lens 50 to transmit rotation of the output shaft 35 of the motor 34 to the wire 37 via the coupling 36, rotating shaft 41, and pulley 40a. Upon the transmission of rotation of the output shaft 35, the wire 37 travels counterclockwise as well to separate the pressing unit 39 from the stopper plate 47, thereby canceling the locked state of the slider 3. The pressing unit 39 moves forward by a predetermined distance with the traveling of the wire 37, thereby being detected by a photosensor 51. The photosensor 51 serves to detect the motion of the pressing unit 39 as a moving displacement of the slider 3 in the Y direction from its origin position in the Y direction. The photosensor 51 detects the pressing unit 39, and sends a signal indicating the detection result to a control unit. In response to the detection signal from the photosensor 51, the control unit stops the motor 34. Hence, the pressing unit 39 remains at the position, detected by the photosensor 51, until bevel measurement of the spectacle lens 50 ends. When the measurement is complete, the pressing unit 39 retracts and is pressed against the stopper plate 47 again upon driving the motor 34 in the direction opposite to that of the above-mentioned driving to allow the wire 37 to travel clockwise.

The slider 3 moves forward using a pressing force, generated by the pressing force application device 14, at the time of bevel measurement of the spectacle lens 50. When the slider 3 moves by a predetermined distance, it stops at a specific position after the stylus 13 abuts an edge surface 50c of the spectacle lens 50.

Referring to FIG. 5, the spectacle lens 50 is a lens (round lens) edged into a round shape, and has a bevel 52 integrally projecting from the edge surface 50c over the entire periphery. The bevel 52 is a projection which has a mountain-shaped cross-section and is formed in an isosceles triangle that normally has a vertex angle of about 90°, 100°, or 110°. The spectacle lens 50 is horizontally set on the upper surface of a lens holder 55 with a convex optical surface 50a facing down and a concave optical surface 50b facing up at the time of bevel measurement, and is then attached to a lens rotating shaft 54 through the lens holder 55. The lens rotating shaft 54 is rotated (rotation speed: about 30 rpm) by a stepping motor (not shown) at the time of bevel measurement, and its rotation angle is measured by a rotation angle measurement device 57 as the rotation angle (θ) of the spectacle lens 50.

Figure 4:
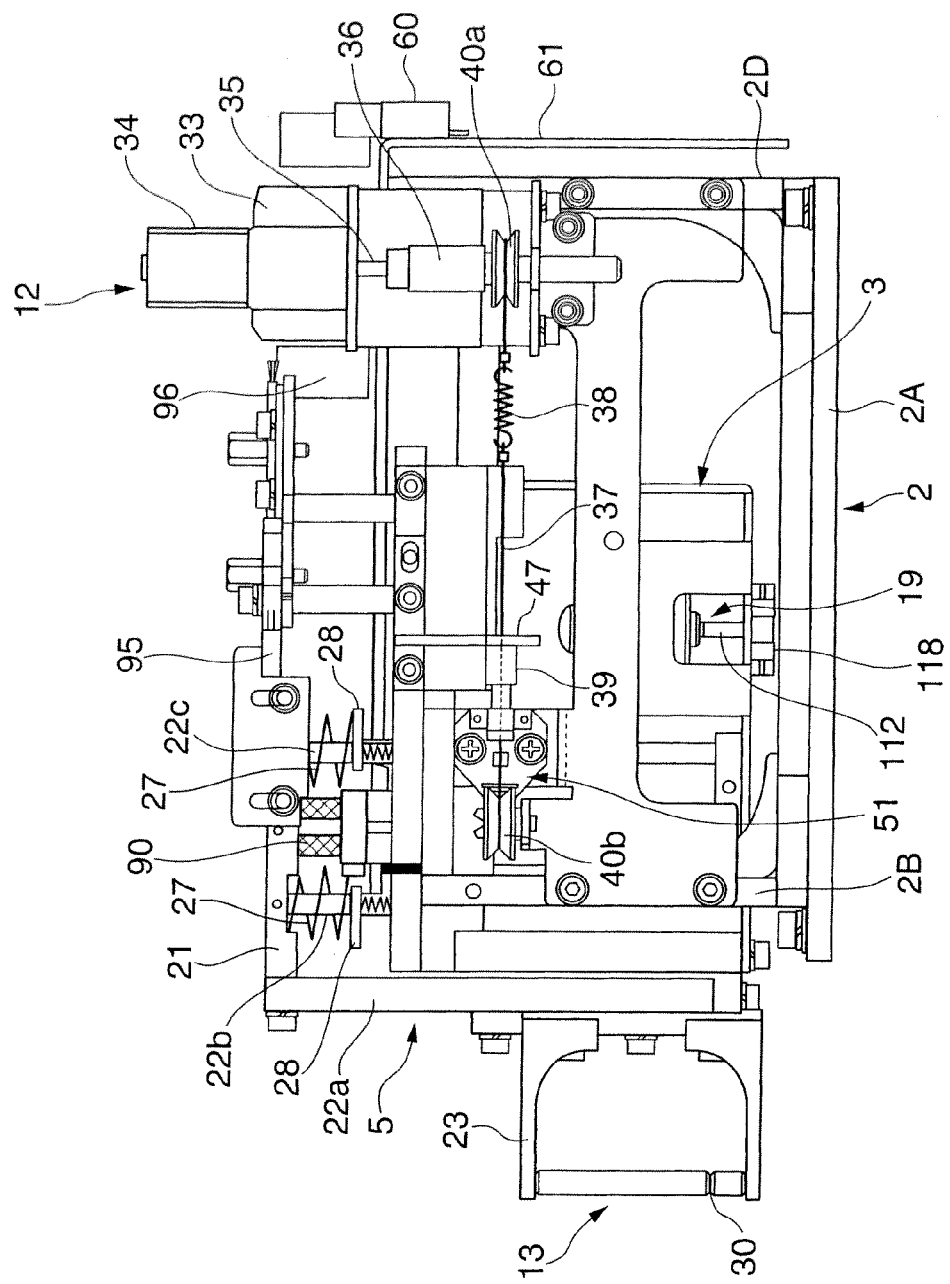
FIG. 4 is a side view of the bevel perimeter measurement apparatus.

Referring to FIG. 4, a Y-axis motor origin sensor 60 which detects the origin position of the Y-direction driving motor 34 is disposed on the back surface of the support portion 2D of the frame 2 through an attachment plate 61.

Figure 2:
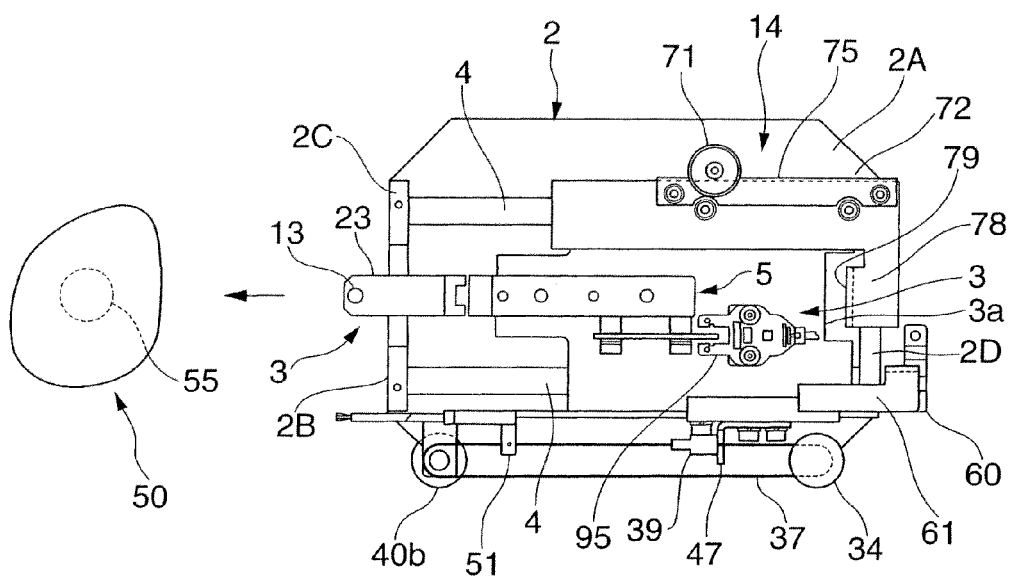
FIG. 2 is a plan view of the bevel perimeter measurement apparatus.

Referring to FIGS. 2 and 3, the pressing force application device 14 includes a motor 71, and a rotation-rectilinear motion conversion means 72 for converting rotation of the motor 71 into a rectilinear motion and transmitting it to the slider 3. The motor 71 is placed, on the upper surface of an attachment plate 70, attached to the right side surface of the frame 2, facing down. The front and rear ends of the attachment plate 70 are connected to the support portions 2C and 2D, respectively, of the frame 2.

The rotation-rectilinear motion conversion means 72 includes a pinion 74 and rack 75 which mesh with each other, a movable plate 76 to which the rack 75 is attached and which moves forward/backward along a guide 77, and a pressing plate 78 fixed on the upper surface of the movable plate 76. The pinion 74 is formed at the lower end portion of an output shaft 73 of the motor 71. The rack 75 is fixed on the upper surface of the pressing plate 78, and meshes with the pinion 74. The movable plate 76 is disposed to be forwardly/backwardly movable on the guide 77 provided on the upper surface of the frame 2, and the pressing plate 78 is fixed on its upper surface. A pressing portion 79 which presses a rear end face 3a (FIG. 2) of the slider 3 forward is integrally formed at the rear end of the pressing plate 78 by downward bending. Thus, rotation of the output shaft 73 of the motor 71 is transmitted to the slider 3 in turn via the pinion 74, the rack 75, the movable plate 76, and the pressing portion 79 of the pressing plate 78 by driving the motor 71. With this operation, the slider 3 moves forward to press the stylus 13 against the edge surface 50c of the spectacle lens 50 by a predetermined pressing force.

The pressing force of the stylus 13 against the spectacle lens 50 can be variously set to appropriate values (e.g., 50 g, 70 g, 85 g, 100 g, 120 g, 135 g, or 150 g) at several grades by changing the value of a current supplied to an exciting coil of the motor 71. This is to prevent the stylus 13 from pressing the spectacle lens 50 by an excessively large pressing force.

Hence, the bevel measurement groove 30 is desirably engaged with the bevel 52 by lifting the stylus 13 after a small pressing force is set in the beginning, and, if the bevel measurement groove 30 does not engage with or only poorly engages with the bevel 52, returning the stylus 13 to its initial lowermost position, setting a pressing force larger than at the previous time, and lifting the stylus 13 again. Note that two or three pressing forces are set in the control unit in advance in accordance with the lens shape.

Referring to FIGS. 1 and 5, the Z-axis-direction displacement measurement device 15 which detects a vertical (Z-direction) displacement of the stylus 13 is a conventionally known one, and includes a cylindrical sensor head 90 fixed on the upper surface of an upper plate 3B of the slider 3, and a sensor rod 91 which runs through the sensor head 90 to be vertically movable in a noncontact state. The sensor head 90 is formed by aligning nine flat coils in the axial direction. In these coils, five, odd-numbered (1, 3, 5, 7, 9) coils form a primary exciting coil, and four, even-numbered (2, 4, 6, 8) coils form a secondary induction coil. The sensor rod 91 is formed by alternately arraying pluralities of magnetic balls and nonmagnetic balls in a cylinder made of a nonmagnetic material such as SUS303, and vertically suspends from the upper plate 21 of the stylus holder 5. In the Z-axis-direction displacement measurement device 15 with the foregoing arrangement, as the sensor rod 91 vertically moves relative to the sensor head 90 with vertical movement of the stylus holder 5, an induction voltage is generated in the induction coil of the sensor head 90. Since the magnitude of this induction voltage is proportional to the vertical movement of the stylus holder 5, a vertical displacement of the stylus holder 5 can be detected as a vertical displacement Z of the stylus 13 by detecting this induction voltage and performing its signal processing.

A Z-axis origin sensor 95 and Y-axis origin sensor 96 (FIGS. 1 to 3) which detect the origin position of the stylus holder 5 as that of the stylus 13 are also disposed on the upper surface of the frame 2.

Referring to FIG. 3, the horizontal displacement measurement device 16 is similar to the Z-axis-direction displacement measurement device 15. The horizontal displacement measurement device 16 includes a cylindrical Y-axis linear sensor head 102 disposed on the side of the frame 2 through a bracket 100, and a Y-axis sensor rod 103 elongated forward/backward. The horizontal displacement measurement device 16 detects forward/backward movement of the slider 3 from its origin position as a horizontal (Y-direction) displacement of the stylus 13. The Y-axis sensor rod 103 is disposed on the side of the slider 3, and slidably runs through the Y-axis linear sensor head 102 in a noncontact state.

Referring to FIGS. 5 to 8, the retracting device 19 includes, e.g., a driving device 111, a screw rod 112 built into the driving device 111, a pivoting lever 113 which pivots vertically, and a biasing spring 115 which biases the pivoting lever 113 counterclockwise in FIG. 5. A linear stepping actuator is used as the driving device 111. The screw rod 112 runs through the driving device 111, and vertically moves while rotating upon being driven by the driving device 111. The pivoting lever 113 includes a first lever 113A, and second lever 113B. The first lever 113A has its proximal end axially supported to be vertically pivotable by a shaft 116, and is pushed up by the screw rod 112 at the time of lock cancellation of the stylus holder 5. The second lever 113B normally holds the stylus holder 5 at the lowermost position by pressing a pin 117, provided on the stylus holder 5, by the spring force of the biasing spring 115 from above. The biasing spring 115 is a tensile coil spring, has its upper end locked to the second lever 113B, and its lower end locked to the bottom plate 3A of the slider 3.

During non-measurement, the retracting device 19 retracts the stylus 13 to the lowermost position (retraction position) by pressing the second lever 113B against the pin 117 by pressing down the stylus holder 5 using the biasing spring 115, as shown in FIG. 5, to prevent the spectacle lens 50 and stylus 13 from interfering with each other. In this retracted state, the screw rod 112 stops at the origin position (lowermost position). The spring force of the biasing spring 115 is set larger than that of the biasing springs 27.

Figure 6:
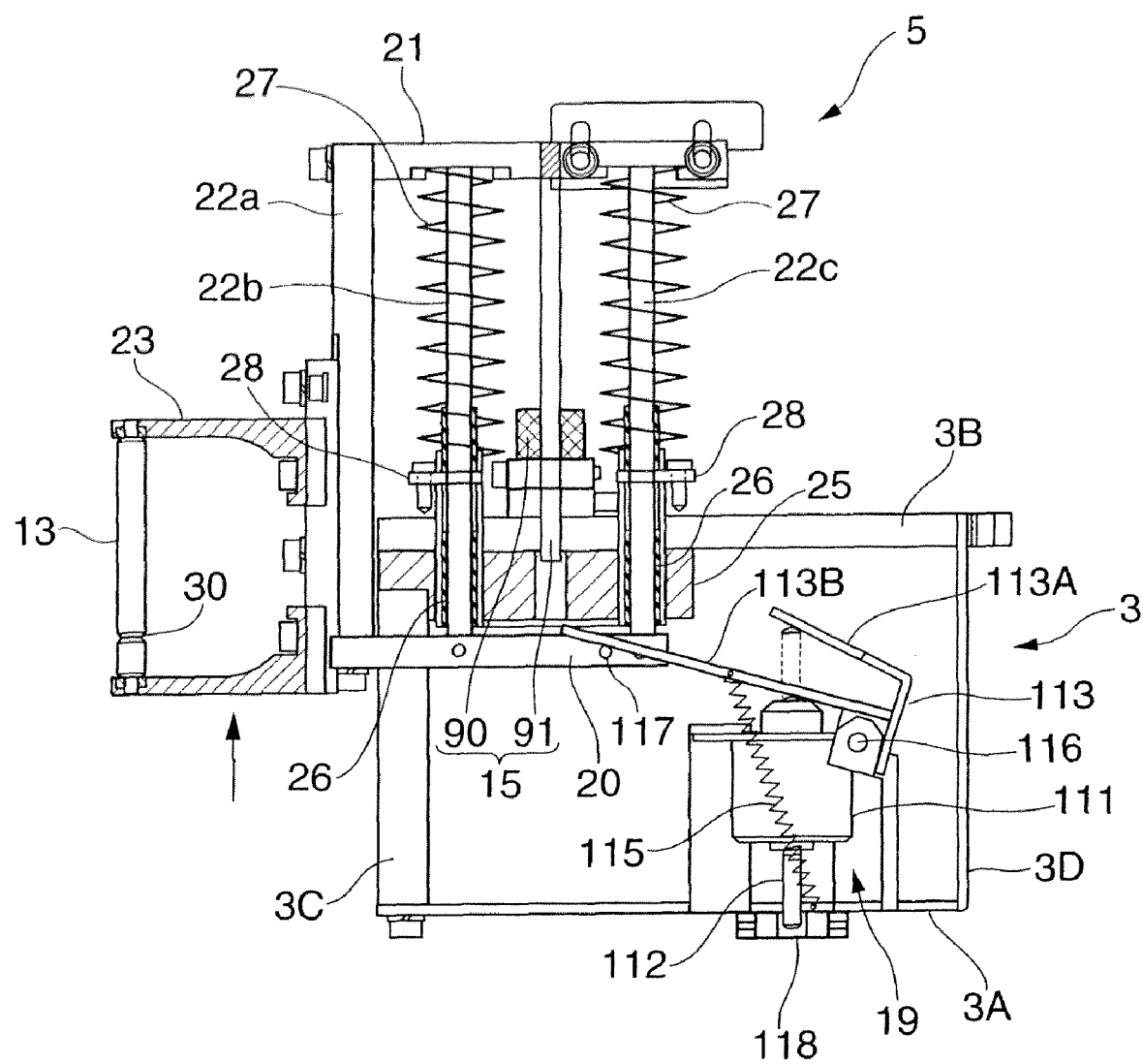
FIG. 6 is a sectional view showing the state in which the stylus holder is released from a retracting device.

At the time of bevel measurement of the spectacle lens 50, when the driving device 111 is driven by energization to rotationally lift the screw rod 112, the pivoting lever 113 gradually pivots clockwise in FIG. 5 against the biasing spring 115 upon pushing up the first lever 113A by the screw rod 112, to allow the second lever 113B to ascend. Upon the ascent of the second lever 113B, the pressing force of the second lever 113B against the pin 117 gradually weakens. In other words, the pressing force of the biasing spring 115 against the stylus holder 5 gradually lessens. As the elastic repulsive force of the biasing springs 27 surpasses the pressing force of the biasing spring 115, the stylus holder 5 gradually begins to ascend. With this ascent, when the screw rod 112 ascends up to a maximum level, as shown in FIG. 6, the stylus holder 5 is released from the retracting device 19, and stops after the bottom plate 20 abuts against the attachment plate 25 of the slider 3 from below.

A retracting device origin sensor 118 which detects the origin position of the driving device 111 is provided on a bottom plate 3A of the slider 3 in correspondence with the screw rod 112. The origin sensor 118 is turned on/off by an operation of lifting/lowering the screw rod 112. The origin sensor 118 is kept ON when the screw rod 112 is stopped at the origin position, and is switched off upon the ascent of the screw rod 112 by driving the driving device 111.

A bevel measurement operation by the bevel perimeter measurement apparatus 1 with the above-mentioned structure will be described next.

First, the edged, round spectacle lens 50 is attached to the lens holder 55, which is attached to the lens rotating shaft 54. At this time, the lens holder 55 is attached to the lens rotating shaft 54 such that the lowest portion of the bevel 52 in the horizontal direction is opposed to the stylus 13.

Next, the pressing force of the stylus 13 against the spectacle lens 50 is set by the pressing force application device 14. Three, large, medium, and small pressing forces, for example, are set in advance to this pressing force in order to assure the engagement between the bevel measurement groove 30 in the stylus 13 and the bevel 52 of the spectacle lens 50.

The Y-direction driving device 12 is driven to cancel the locked state of the slider 3. That is, the motor 34 is driven to rotate the pulley 40a counterclockwise in FIG. 1, thereby allowing the wire 37 to travel counterclockwise as well. Upon the traveling of the wire 37, the pressing unit 39 moves forward and separates from the stopper plate 47, so the slider 3 is released.

Figure 7:
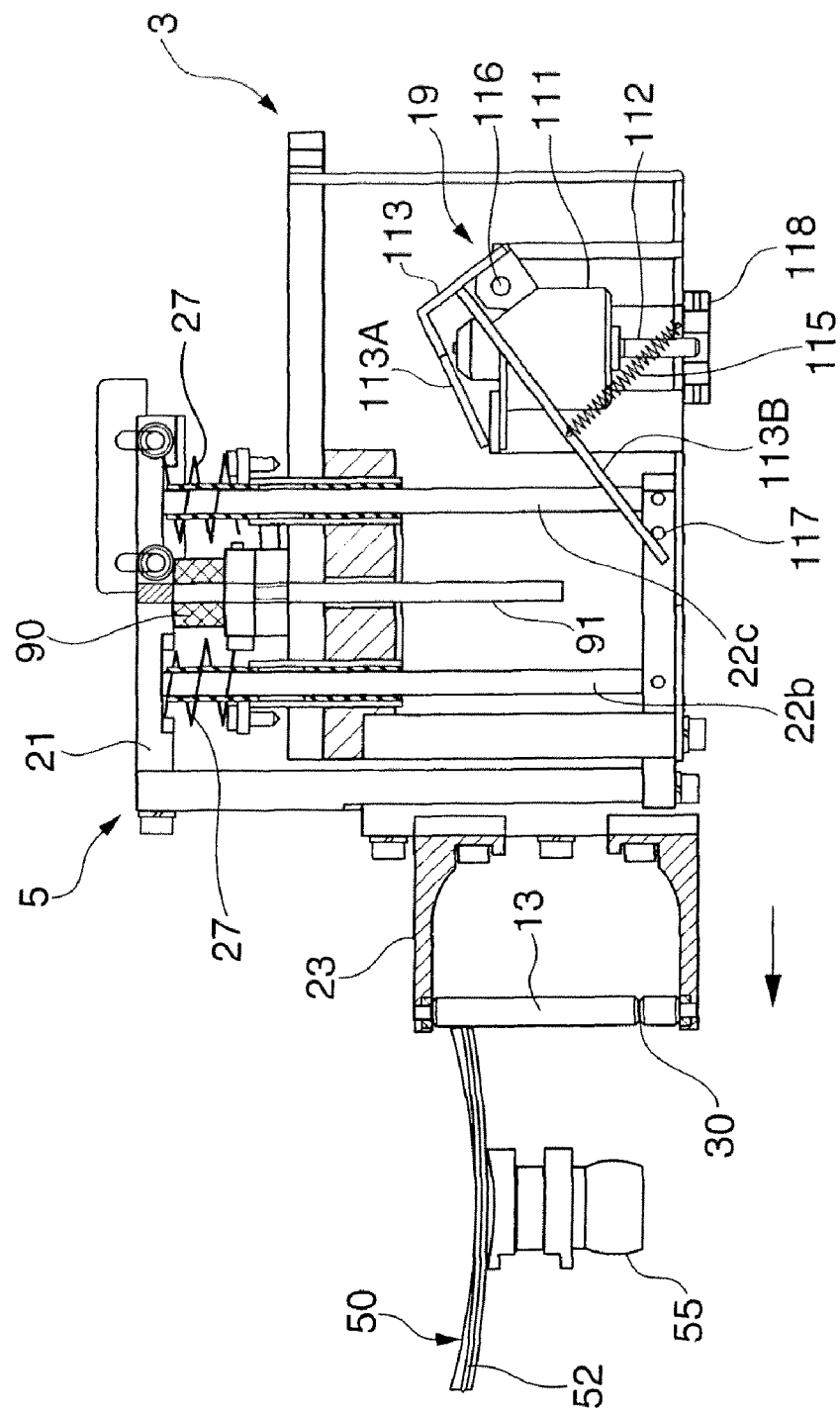
FIG. 7 is a sectional view showing the state in which a stylus is pressed against the edge surface of a spectacle lens.

Simultaneously with the driving of the Y-direction driving device 12, the pressing force application device 14 is driven to move the slider 3 forward. That is, because rotation of the output shaft 73 (FIG. 3) of the motor 71 is transmitted to the slider 3 in turn via the pinion 74, rack 75, movable plate 76, and pressing plate 78 by driving the motor 71, the slider 3 moves forward to press the stylus 13 against the edge surface 50c of the spectacle lens 50 by a predetermined pressing force. FIG. 7 shows this state. In this state, because the stylus 13 is held at the lowermost position, the bevel measurement groove 30 is positioned below the bevel 52. Among the plurality of pressing forces set in advance, a smallest pressing force is selected as a pressing force to be generated by the pressing force application device 14 at this time.

Figure 8:
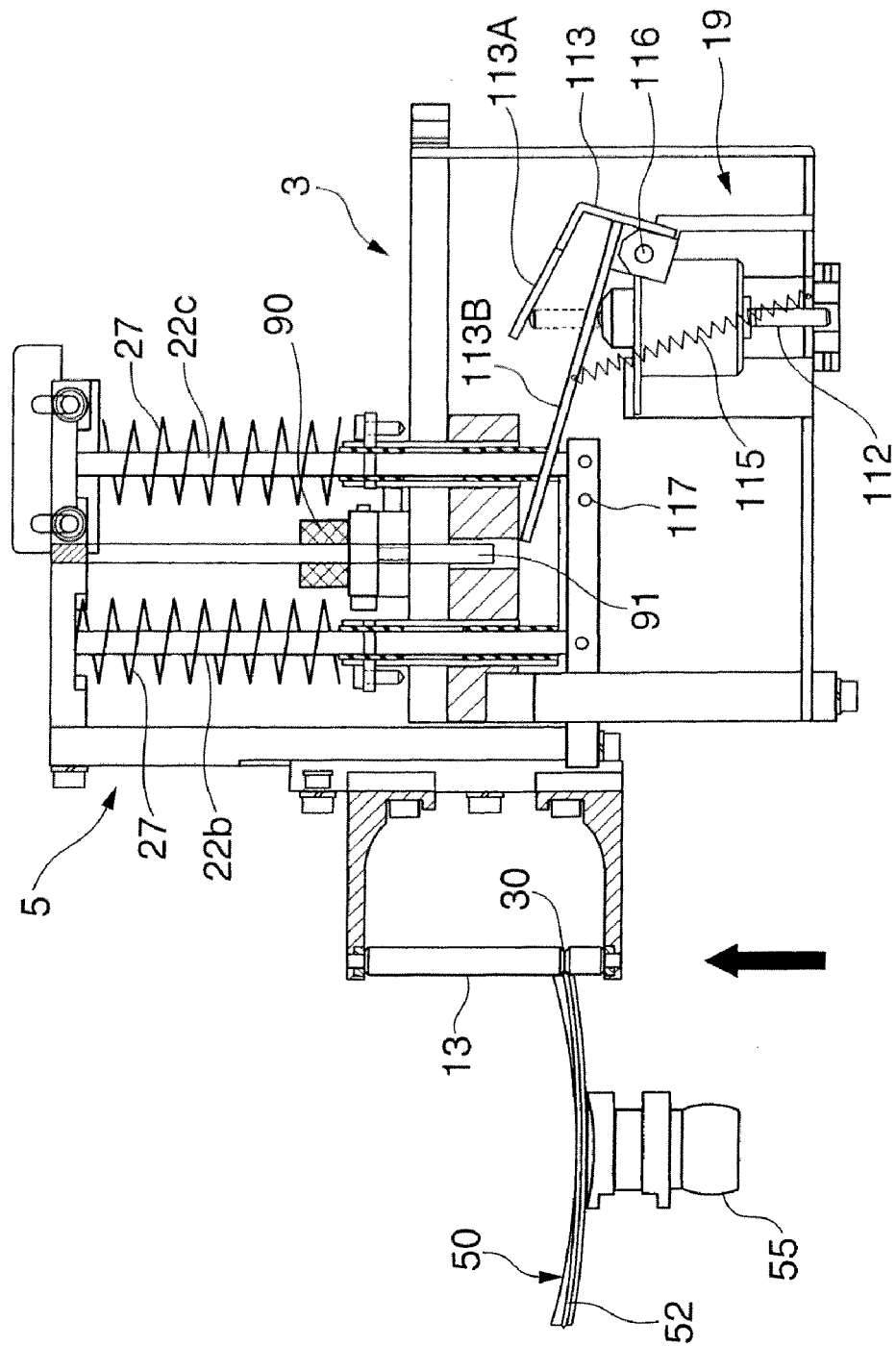
FIG. 8 is a sectional view showing the state in which a bevel measurement groove has engaged with a bevel.

The retracting device 19 is driven to release the stylus holder 5. That is, upon driving the driving device 111, the screw rod 112 ascends while rotating to push up the first lever 113A of the pivoting lever 113, thereby pivoting the pivoting lever 113 clockwise against the biasing spring 115 in FIG. 7. Thus, the second lever 113B also ascends and pivots to gradually weaken the pressing force of the spring 115 against the pin 117 of the pivoting lever 113. With this operation, the spring force of the biasing springs 27 exceeds the pressing force of the biasing spring 115 to gradually lift the stylus holder 5 by the spring force of the biasing springs 27. As the bevel measurement groove 30 ascends up to the same level as the bevel 52 of the spectacle lens 50, the bevel measurement groove 30 engages with the bevel 52 by the pressing force generated by the pressing force application device 14. FIG. 8 shows this state. Note that the bevel measurement groove 30 can reliably engage with the bevel 52 by reciprocally, horizontally pivoting the lens rotating shaft 54 through a small angle such as about ±5° in the process of the ascent of the stylus 13.

If the pressing force generated by the pressing force application device 14 is too weak to engage the bevel measurement groove 30 with the bevel 52, the stylus holder 5 ascends up to the uppermost position and stops. When the stylus holder 5 ascends to the uppermost position and stops, the horizontal displacement measurement device 16 detects the stylus holder 5, and drives the retracting device 19 in accordance with a signal indicating the detection result to return it to its initial state. Therefore, the stylus holder 5 also returns to its initial lowermost position. That is, when the retracting device 19 is driven in the direction opposite to that of the above-mentioned driving, the screw rod 112 descends, and the spring 115 pivots the pivoting lever 113 counterclockwise in FIG. 6. Thus, the second lever 113B pushes down the pin 117 to temporarily lower the stylus holder 5 to the retraction position. After the pressing force of the stylus 13 against the spectacle lens 50 is switched to a value larger than at the previous time, the retracting device 19 is released to lift the stylus holder 5 again, thereby engaging the bevel measurement groove 30 with the bevel 52. If the bevel measurement groove 30 cannot engage with the bevel 52 even at the second time, the stylus holder 5 is returned to the lowermost position again, the pressing force is switched to a larger value, and the stylus holder 5 is lifted again. Note that if the bevel measurement groove 30 cannot engage with the bevel 52 despite the fact that the pressing force is changed twice, it is determined that an abnormality has occurred, and the bevel measurement is canceled.

After the bevel measurement groove 30 engages with the bevel 52, and the stylus holder 5 stops at a specific position, bevel measurement takes place. That is, the lens rotating shaft 54 is rotated through 360°, and the perimeter and shape of the bevel 52 are measured by the rotation angle measurement device 57, Z-axis-direction displacement measurement device 15, and horizontal displacement measurement device 16. The rotation angle measurement device 57 measures the rotation angle θ of the spectacle lens 50 every, e.g., 0.25°, that is, 1,440 times per 360-degree rotation in, e.g., 12 sec.

The Z-axis-direction displacement measurement device 15 measures vertical movement of the stylus holder 5 as a Z-direction displacement of the stylus 13 in synchronism with the measurement of the rotation angle measurement device 57.

Likewise, the horizontal displacement measurement device 16 measures forward/backward movement of the slider 3 as a Y-direction displacement of the stylus 13 in synchronism with the measurement of the rotation angle measurement device 57.

After the measurement of the bevel 52 is completed upon 360-degree rotation of the spectacle lens 50, the perimeter and shape of the vertex of the bevel 52 are calculated by a known perimeter calculation means based on the measured values ($\theta$, r, z) measured by the rotation angle measurement device 57, horizontal displacement measurement device 16, and Z-axis-direction displacement measurement device 15, respectively. The perimeter of the vertex of the bevel 52 calculated by the perimeter calculation means, and the rim shape data the spectacle frame are then compared with each other. If the difference between these two data falls below an allowable value such as 0.1 mm, the spectacle lens 50 is determined to be acceptable, and the bevel measurement ends.

In this manner, the bevel perimeter measurement apparatus 1 according to the present invention includes the pressing force application device 14, and the bevel measurement groove 30 in the stylus 13 engages with the bevel 52 by lifting the stylus holder 5 while the stylus 13 is pressed against the edge surface of the spectacle lens 50 using the pressing force application device 14. Hence, the bevel measurement groove 30 can reliably engage with the bevel 52 without bothering the operator with this operation even if the bevel of a spectacle lens whose data is absent is to be measured.

Also, the bevel perimeter measurement apparatus 1 according to the present invention includes the retracting device 19 which retracts the stylus holder 5 to the retraction position against the biasing springs 27 during non-measurement. Hence, by keeping the stylus 13 retracted at the retraction position, the spectacle lens 50 can be set on the lens rotating shaft free from obstruction by the stylus 13, so the spectacle lens 50 and stylus 13 can be prevented from interfering with each other.

Moreover, in the bevel perimeter measurement apparatus 1 according to the present invention, the pressing force application device 14 includes the motor 71, and the rotation-rectilinear motion conversion means 72 for converting rotation of the rotating shaft of the motor 71 into a rectilinear motion and transmitting it to the stylus holder 5. Hence, a pressing force which presses the stylus 13 against the spectacle lens 50 can be freely changed by changing the value of a current supplied to the motor 71. This facilitates change in pressing force compared to the use of a spring.

Figure 9:
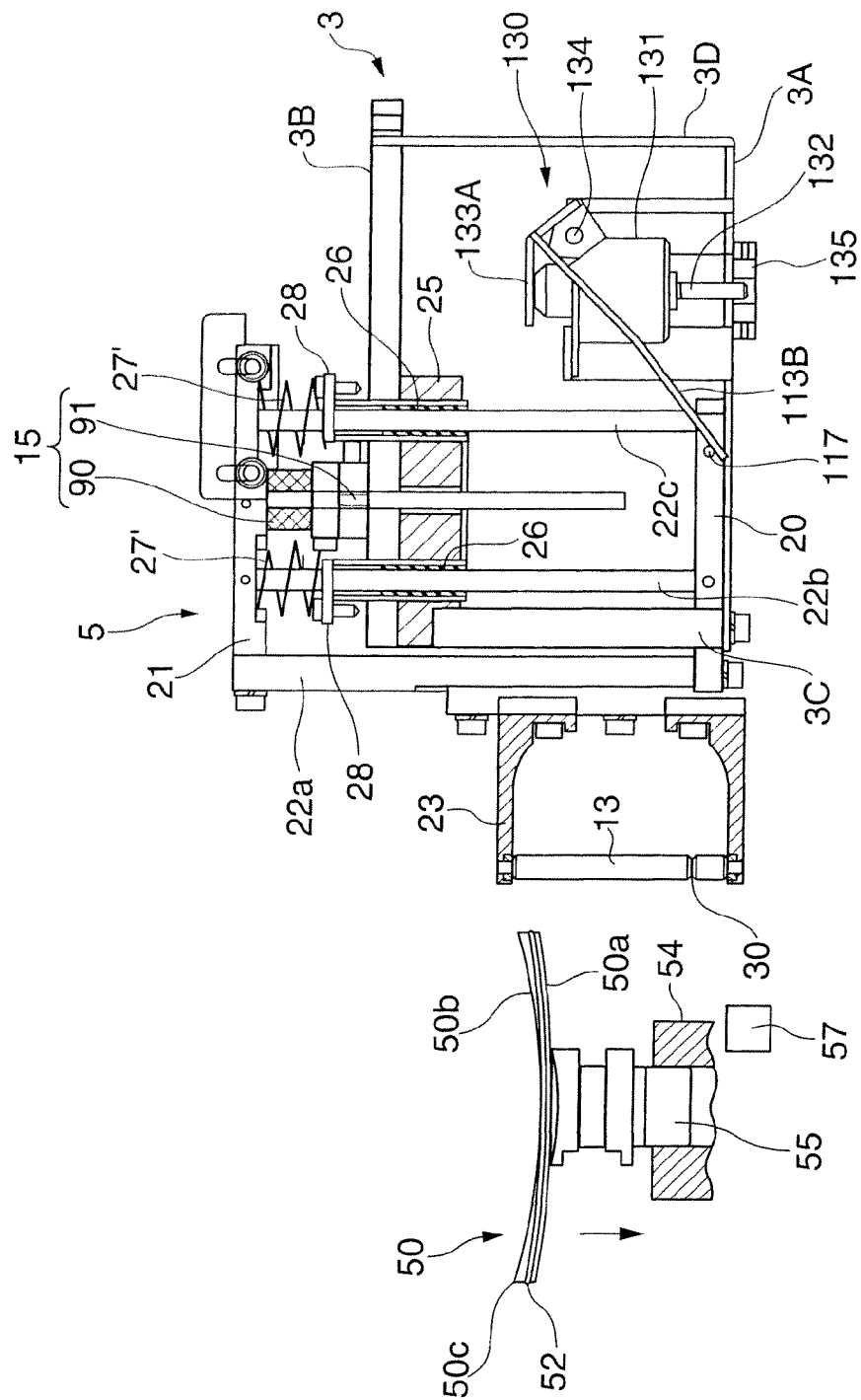
FIG. 9 is a sectional view during non-measurement, which shows another embodiment of the present invention.

FIG. 9 is a sectional view showing another embodiment of the stylus lift device.

Referring to FIG. 9, in this embodiment, a stylus holder 5 is held at the lowermost position (retraction position) by its own weight, and is lifted to the measurement position by a stylus lift device 130 at the time of measuring the perimeter of a bevel 52. Hence, the retracting device 19 used in the above-mentioned embodiment omitted, and the stylus lift device 130 is arranged at the position where the retracting device 19 has been set previously.

The stylus holder 5 is lifted to the measurement position by the stylus lift device 130 at the time of measurement to engage a bevel measurement groove 30 with the bevel 52, thereby being held at the measurement position by a pressing force generated by a pressing force application device 14 (FIGS. 1 and 2). When the measurement is complete, the stylus holder 5 is released from the pressing force generated by the pressing force application device 14 so as to descend by its own weight and return to the lowermost position.

Springs 27' that are compression coil springs are elastically attached between spring plates 28 and an upper plate 21 of a slider 3. The springs 27' are used to prevent the stylus holder 5 from descending by its own weight as engagement between the bevel measurement groove 30 and the bevel 52 is canceled due to, e.g., vibration during measurement, and have a spring force slightly smaller than the own weight of the stylus holder 5.

The stylus lift device 130 includes a motor 131, a screw rod 132 which converts rotation of the rotating shaft of the motor 131 into a vertical motion, and a pivoting lever 133 which pivots upon the vertical movement of the screw rod 132. The screw rod 132 is normally held at the lowermost position, and ascends upon driving the motor 131 at the time of measurement.

The pivoting lever 133 has its one end axially supported to be vertically pivotable by a shaft 134. The pivoting lever 133 integrally includes a first arm 133A which is in contact with the upper end face of the screw rod 132, and a second arm 133B which extends obliquely downward and is in contact with the lower surface of a pin 117 of the stylus holder 5. The pivoting lever 133 has counterclockwise pivotal slidability resulting from its own weight. When the screw rod 132 ascends upon driving the motor 131 at the time of measurement, it pushes up the first arm 133A to pivot the pivoting lever 133 clockwise in FIG. 9. Upon the pivoting of the pivoting lever 133 by the screw rod 132, the second arm 133B pushes up the pin 117 to lift the stylus holder 5. When the stylus holder 5 ascends, and the bevel measurement groove 30 engages with the bevel 52, the rotation direction of the motor 131 is switched. Therefore, the screw rod 132 descends and returns to its initial position. Also, the pivoting lever 133 pivots by its own weight, and returns to the lowermost position to release the stylus holder 5. On the other hand, the stylus holder 5 is held in the state in which the bevel measurement groove 30 has engaged with the bevel 52 by a pressing force, generated by the pressing force application device 14, until the measurement ends. Note that since other structures are nearly the same as in the above-mentioned embodiment, the same reference numerals denote the same components and portions, and a description thereof will not be given.

The stylus lift device 130 with the foregoing arrangement can reliably lift the stylus holder 5 to the measurement position as well as the former embodiment, and need not include the retracting device 19.

INDUSTRIAL APPLICABILITY

A bevel perimeter measurement apparatus and method according to the present invention are suitable for use in bevel perimeter measurement of a spectacle lens, especially, a lens whose data is absent.

The invention claimed is:

1. An apparatus for measuring a bevel perimeter of a spectacle lens, comprising:
a retractable slider;
a stylus holder disposed to be vertically movable on said slider;
a rod-like stylus which is held by said stylus holder and has a bevel measurement groove formed on an outer periphery thereof;
a horizontal displacement measurement device which senses that said stylus has engaged with a bevel, based on determination as to whether said stylus holder has moved in a horizontal (Y-axis) direction upon the engagement, and measures a horizontal displacement of said stylus;

a pressing force application device which moves said slider forward at a time of bevel measurement to press said stylus against an edge surface of the spectacle lens, thereby engaging the bevel measurement groove with the bevel;

a stylus lift device which lifts said stylus holder at the time of bevel measurement;

a rotation angle measurement device which measures a rotation angle of the spectacle lens with respect to said stylus; and a Z-axis-direction displacement measurement device which detects a vertical displacement of said stylus.

2. An apparatus for measuring a bevel perimeter of a spectacle lens according to claim 1, wherein said stylus lift device includes a biasing spring.

3. An apparatus for measuring a bevel perimeter of a spectacle lens according to claim 2, further comprising a retracting device which retracts said stylus holder against said biasing spring during non-measurement.

4. An apparatus for measuring a bevel perimeter of a spectacle lens according to claim 1, wherein said stylus lift device includes a motor, a screw rod which converts rotation of a rotating shaft of said motor into vertical movement, and a pivoting lever which pivots upon the vertical movement of said screw rod.

5. An apparatus for measuring a bevel perimeter of a spectacle lens according to claim 1, wherein said pressing force application device includes a motor, and rotation-rectilinear motion conversion means for converting rotation of a rotating shaft of said motor into a rectilinear motion and transmitting the rectilinear motion to said stylus holder.

6. A method of measuring a bevel perimeter of a spectacle lens, comprising the steps of:

pressing a portion, of an outer peripheral surface of a rod-like stylus having a bevel measurement groove formed on the outer peripheral surface, above the bevel measurement groove against an edge surface of the spectacle lens by a predetermined pressing force;

lifting the stylus while the stylus is pressed against the edge surface of the spectacle lens, to engage the bevel measurement groove with a bevel formed on the edge surface of the spectacle lens; and rotating the spectacle lens when the bevel measurement groove has engaged with the bevel, and measuring a rotation angle of the spectacle lens with respect to the stylus, a horizontal displacement of the stylus, and a vertical displacement of the stylus.

7. A method of measuring a bevel perimeter of a spectacle lens according to claim 6, further comprising the steps of:

if the bevel measurement groove has not engaged with the bevel, lowering the stylus to return the stylus to an initial lowermost position thereof; and pressing the stylus against the edge surface of the spectacle lens by a pressing force larger than at the previous time to lift the stylus.

8. A method of measuring a bevel perimeter of a spectacle lens according to claim 6, further comprising the step of reciprocally pivoting the spectacle lens through a small angle within a horizontal plane at a time of ascent of the stylus.

* * * * *